US011095566B2

(12) United States Patent
Miller et al.

(10) Patent No.: US 11,095,566 B2
(45) Date of Patent: Aug. 17, 2021

(54) EMBEDDED DEVICE INTERACTION RESTRICTIONS (71) Applicant: Hewlett Packard Enterprise Development LP, Houston, TX (US)

(72) Inventors: Troy Miller, Plano, TX (US); Cherryl Dawson, Plano, TX (US); Geoffery Schunicht, Spring, TX (US); Jerry James Harrow, Jr., Brookline, NH (US); Mark A. Criss, McKinney, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/166,967

(22) Filed: Oct. 22, 2018

(65) Prior Publication Data

US 2020/0127927 A1   Apr. 23, 2020

(51) Int. Cl.
*H04L 12/825* (2013.01)
*H04L 12/26* (2006.01)
*H04L 29/08* (2006.01)

(52) U.S. Cl.
CPC .............. *H04L 47/25* (2013.01); *H04L 43/10* (2013.01); *H04L 43/16* (2013.01); *H04L 67/16* (2013.01)

(58) Field of Classification Search
CPC ......... H04L 47/25; H04L 43/16; H04L 43/10; H04L 67/16; H04L 69/28; H04L 67/12; H04L 43/0882; H04L 47/26; H04L 47/19
See application file for complete search history.

(56) References Cited

U.S. PATENT DOCUMENTS

| 5,774,669 | A | 6/1998 | George et al. |
| 7,580,972 | B2 * | 8/2009 | Jones ...................... H04L 29/06 370/230 |
| 7,650,379 | B2 * | 1/2010 | Hart ........................ H04L 47/10 709/203 |
| 7,676,585 | B1 | 3/2010 | Francke et al. |
| 8,334,857 | B1 * | 12/2012 | Ogrinc ................... G09G 5/377 345/204 |
| 8,422,994 | B2 * | 4/2013 | Rhoads ................... G06F 3/017 455/411 |

(Continued)

OTHER PUBLICATIONS

Lee, S. et al.; "Sequential Hypothesis Testing Based Polling Interval Adaptation in Wireless Sensor Networks for IoT Applications"; Mar. 31, 2017; 1 page.

*Primary Examiner* — Michael Won
(74) *Attorney, Agent, or Firm* — Brooks, Cameron & Huebsch, PLLC (57) ABSTRACT

In some examples, a non-transitory machine-readable medium can include instructions executable by a processing resource to: monitor a quantity of interactions between a plurality of user interfaces with an embedded device, determine when the quantity of interactions with the embedded device exceeds a threshold, send a slow-down message to a portion of the plurality of user interfaces in response to the interactions with the embedded device exceeding the threshold, and restrict a portion of the quantity of interactions with the embedded device when the quantity of interactions continues to exceed the threshold for a quantity of time after the slow-down message was sent to the portion of the plurality of user interfaces.

12 Claims, 5 Drawing Sheets

(56) References Cited

U.S. PATENT DOCUMENTS

| | | | |
|---|---|---|---|
| 8,458,254 B2* | 6/2013 | Yan | H04L 45/64 709/204 |
| 8,527,626 B1 | 9/2013 | Wang et al. | |
| 8,638,670 B2* | 1/2014 | Johnson | H04L 47/25 370/236 |
| 9,448,839 B2 | 9/2016 | Jain | |
| 9,514,162 B2 | 12/2016 | Bertram et al. | |
| 9,900,801 B2* | 2/2018 | Papa | H04W 28/0247 |
| 10,027,559 B1* | 7/2018 | Kerl | H04L 41/0896 |
| 2009/0125632 A1* | 5/2009 | Purpura | H04L 63/10 709/229 |
| 2014/0047517 A1* | 2/2014 | Ding | H04L 12/1453 726/5 |
| 2015/0088697 A1* | 3/2015 | Garnepudi | G06Q 30/0637 705/26.82 |
| 2015/0334703 A1* | 11/2015 | Xu | H04L 1/0002 370/253 |
| 2015/0350332 A1* | 12/2015 | Rauenbuehler | H04M 1/7253 709/228 |
| 2015/0363261 A1* | 12/2015 | Warnes | G06F 11/106 714/721 |
| 2016/0006673 A1* | 1/2016 | Thomas | H04L 47/70 709/226 |
| 2017/0195245 A1* | 7/2017 | Bhatia | H04L 47/25 |
| 2017/0201458 A1* | 7/2017 | Rivera | H04L 12/1435 |
| 2017/0223508 A1* | 8/2017 | Gordon | G06F 1/325 |
| 2018/0004340 A1* | 1/2018 | Yeh | G01S 17/08 |
| 2018/0316752 A1* | 11/2018 | Hodges | H04L 67/1023 |
| 2019/0013081 A1* | 1/2019 | Blodgett | G11C 16/3418 |
| 2019/0116122 A1* | 4/2019 | Friedman | H04L 47/12 |
| 2019/0172427 A1* | 6/2019 | Saini | G09G 3/20 |
| 2019/0207868 A1* | 7/2019 | Chang | H04L 41/042 |
| 2020/0097359 A1* | 3/2020 | O'Connor | G06F 11/1068 |
| 2020/0192749 A1* | 6/2020 | Richter | G06F 11/1048 |
| 2020/0202354 A1* | 6/2020 | Senn | G06Q 20/29 |
| 2020/0258566 A1* | 8/2020 | Schaefer | G11C 11/40626 |

* cited by examiner

EMBEDDED DEVICE INTERACTION RESTRICTIONS

BACKGROUND

A computing system topology can include a plurality of computing devices that can utilize applications to perform functions. The computing devices can be hardware devices that can communicate with other computing devices or perform particular functions. The computing devices can utilize instructions stored on memory resources that can be executed by a processing resource. When installing or deploying a computing system, the plurality of computing devices can be interconnected based on the computing system topology.

DETAILED DESCRIPTION

A network or computing system can include a plurality of computing devices that be utilized to perform particular functions and/or communicate with other devices. For example, a computing system can include servers, access points, databases, virtual machines, and/or other types of computing devices. In some examples, a network or computing system can be an internet of things (IoT) network. As used herein, an IoT network can, for example, include a network of devices (e.g., network devices, computing devices, IoT devices, etc.) with networking capabilities to send and receive data. As used herein, an IoT device can, for example, include a non-traditional network device with networking capabilities to send and receive data with other computing devices and/or other IoT devices.

In some examples, IoT devices such as embedded devices can be utilized to provide services for other IoT devices of the IoT network. For example, user interfaces can utilize IoT devices to display services (e.g., web services, messaging service, etc.) and/or update data associated with a service. As used herein, a user interface can, for example, include a device that can display data and/or receive inputs such that the user interface can allow a user to interact with computing devices, network devices, and/or IoT devices. For example, a user interface can include a display to display data received by an IoT device and/or receive instructions that can be converted to messages sent to the IoT device. In some examples, the data exchanged between the IoT device and the user interface can be considered interactions or pings.

As used herein, an interaction can, for example, include a message or request exchanged between a user interface and an IoT device. For example, an interaction can include an HTTPS call or poll from the user interface to an IoT device to refresh or update data displayed by the user interface. In some examples, the user interface can utilize a particular refresh rate with a particular IoT device. As used herein a refresh rate can, for example, be a rate of interactions over a period of time. For example, a refresh rate for a first user interface can be 60 calls per minute and a refresh rate for a second user interface can be 12 calls per minute. In this example, the first user interface can be updated more frequently than the second user interface and thus have more up to date data compared to the second user interface.

In some examples, the IoT device can generate a load that corresponds, at least in part, to a quantity of requests from user interfaces. In some examples, the IoT device can have a maximum load or load that exceeds a threshold value where the IoT device is not capable of responding to interactions from the user interfaces. For example, the IoT device may be capable of responding to a particular quantity of calls per minute from a plurality of user interfaces. In this example, if the quantity of calls per minute exceeds a threshold quantity of calls per minute, the IoT device may not be capable of responding to all of the user interfaces.

In some examples, the IoT device can include a performance monitor to monitor the a of the IoT device. In these examples, the IoT device can determine when a threshold load has been exceeded. The present disclosure describes, systems, methods, and computer readable mediums capable of determining when a threshold load has been exceeded and a number of responses to alter a rate of interactions from the user interfaces. For example, the IoT device can include a message service that can send a message to the plurality of user interfaces that include a message to lower a rate of interactions with the IoT device for a period of time. In other examples, the IoT device can include a restrictor to alter the rate of interactions for the plurality of user interfaces when the threshold load is exceeded. In this way, the IoT device can dynamically alter a rate of interactions or refresh rate of the user interfaces that are currently interacting with the IoT device when a load threshold has been exceeded and return to an original rate of interactions or refresh rate when the load threshold is not exceeded.

Figure 1:
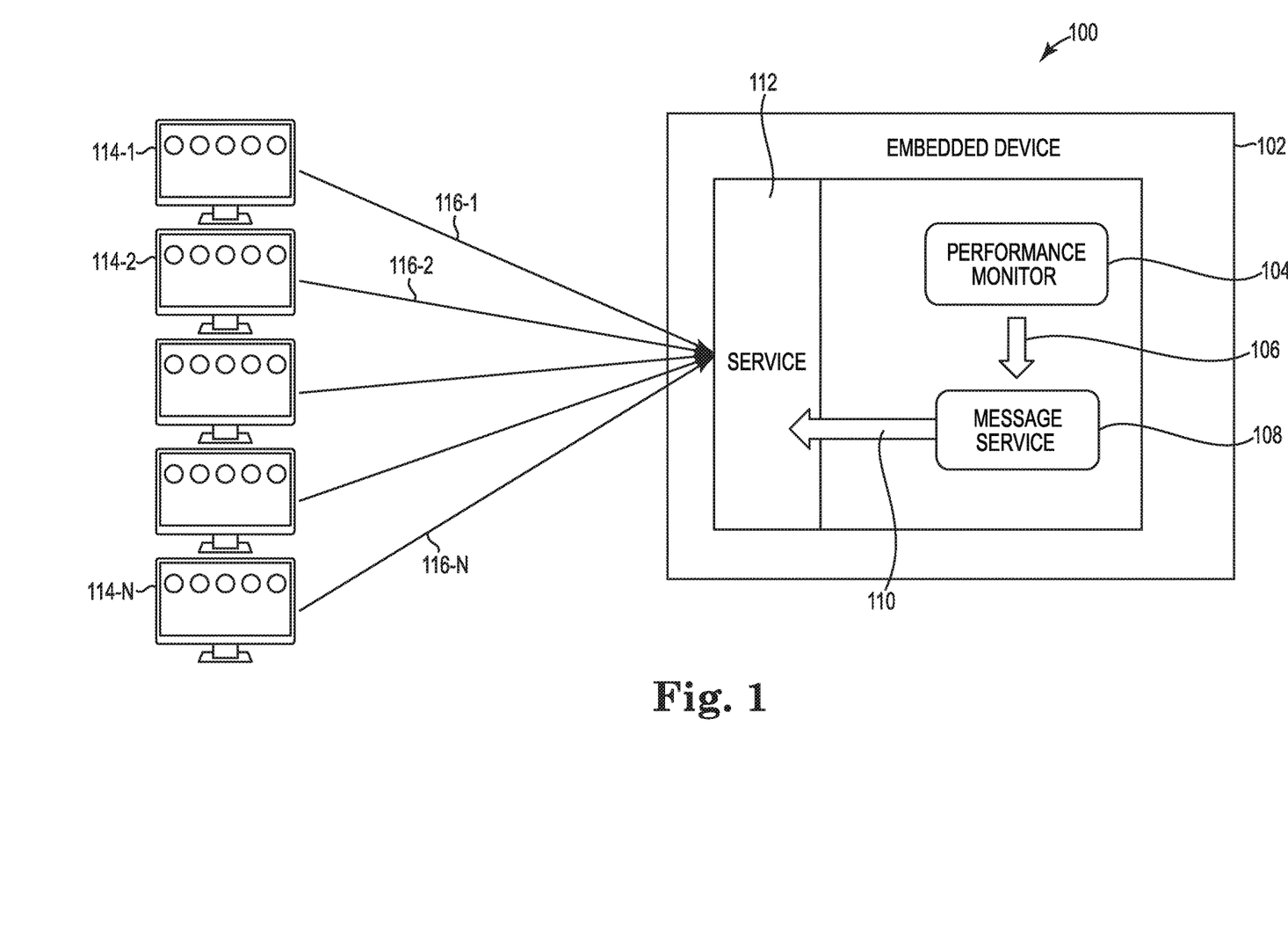
FIG. 1 illustrates an example of a computing system for restricting interactions with an embedded device consistent with the disclosure.

FIG. 1 illustrates an example of a computing system 100 for restricting interactions with an embedded device 102 consistent with the disclosure. In some examples, the embedded device 102 can include a computing device and/or device with an embedded computing device. In some examples, the embedded device 102 can be a non-computing device with embedded computing devices and/or network devices. For example, the embedded device 102 can be a device utilized for a non-computing device function with embedded computing devices and/or network devices. That is, the embedded device 102 can be an internet of things (IoT) device that can be part of an IoT network.

In some examples, the embedded device 102 can include instructions executable by a processing resource to provide a service 112. As used herein, a service 112 can, for example, include executing instructions to provide a particular function. For example, the service 112 can be utilized to generate a user interface or perform a function for a computing device. In some examples, the service 112 can be a web service. As used herein, a web service can, for example, include a service offered by an electronic device such as the embedded device to a different device such as a plurality of user interfaces 114-1, 114-2, 114-N. As described herein, the plurality of user interfaces 114-1, 114-2, 114-N can include devices that can display data and/or receive inputs such that the user interfaces 114-1, 114-2, 114-N can allow a user to interact with computing devices, network devices, and/or IoT devices.

In some examples, the service 112 can be utilized to generate the plurality of user interfaces 114-1, 114-2, 114-N that can be displayed on a screen or monitor of a computing device through a web browser. As used herein, a web browser can, for example, include an application that can be executed by a computing device to access information on a network such as the internet. In some examples, the plurality of user interfaces 114-1, 114-2, 114-N can provide data or information from the service 112 that is displayed on the screen or monitor of the computing device.

In some examples, the data or information can be updated or refreshed when a user interface of the plurality of user interfaces 114-1, 114-2, 114-N performs an interaction with the service 112 of the embedded device 102. For example, the plurality of user interfaces 114-1, 114-2, 114-N can each have a corresponding communication channel 116-1, 116-2, 116-N that the plurality of user interfaces 114-1, 114-2, 114-N can utilize to send a call, an HTTP call, and/or a poll communication. In this example, the service 112 can respond to the interaction with an update to the data or information displayed on the plurality of user interfaces 114-1, 114-2, 114-N via the corresponding communication channel 116-1, 116-2, 116-N.

In some examples, the embedded device 102 can include a performance monitor 104 to monitor a load of the embedded device 102. As used herein, a performance monitor 104 can, for example, include instructions that can be executed by a processing resource to monitor a load of the embedded device 102. As used herein, the load of the embedded device 102 can, for example, include a measure of computation work performed by the embedded device 102. In some examples, the computation work performed can be based in part on a quantity of computations or actions performed by the embedded device 102. In some examples, the load can be based in part on a percentage of processing capabilities being utilized by a processing resource. Thus, the performance monitor 104 can be utilized to monitor the load performed by the embedded device 102 to determine when the load exceeds a threshold load.

As used herein, a threshold load can, for example, include a value of processing capabilities being utilized by the embedded device 102. In some examples, the threshold load can be an indication that the embedded device 102 is or may become overloaded. For example, the threshold load can be a value that if exceeded by the embedded device 102 can indicate that the embedded device 102 may not be capable of providing the service 112 to a particular level or quality of service. In some previous examples, exceeding the threshold load could indicate that service to one or more of the plurality of user interfaces 114-1, 114-2, 114-N is to be discontinued. In the present disclosure, exceeding the threshold load can initiate the performance monitor to send a message or alert to a message service via communication channel 106.

As used herein, a message service 108 can, for example, include instructions executable by a processing resource to send messages or alerts through the plurality of communication channels 116-1, 116-2, 116-N to a plurality of user interfaces 114-1, 114-2, 114-N. In some examples, the message service 108 can be utilized to send slow-down messages and/or slow-down notifications to one or more of the plurality of user interfaces 114-1, 114-2, 114-N. For example, the message service 108 can receive a message or alert from the performance monitor 104 through communication channel 106 that the embedded device 102 has exceeded a load threshold. In this example, the message service 108 can provide a slow-down message to user interfaces 114-1, 114-2, 114-N utilizing the service 112 through communication channel 110. In this example, the service 112 and/or the message service 108 can transmit or send the slow-down message to the plurality of user interfaces 114-1, 114-2, 114-N through the corresponding communication channels 116-1, 116-2, 116-N.

In some examples, the slow-down message can include a notification for a particular user interface of the plurality of user interfaces 114-1, 114-2, 114-N to alter a rate of interactions or refresh rate of the particular user interface. In some examples, the slow-down message can be sent to each of the plurality of user interfaces 114-1, 114-2, 114-N to alter a refresh rate of the corresponding user interfaces 114-1, 114-2, 114-N. In some examples, slow-down message can rely on a user or administrator of the plurality of user interfaces 114-1, 114-2, 114-N to alter the refresh rate.

In some examples, a particular quantity of the plurality of user interfaces 114-1, 114-2, 114-N can alter a corresponding refresh rate such that the load of the embedded device 102 falls below the load threshold. For example, the user interface 114-1 and user interface 114-2 can lower their respective refresh rates in response to the slow-down message and the lowered refresh rates can free up computations performed by the service 112 and thus lower the load of the embedded device 102.

In some examples, the performance monitor 104 can determine if or when the load of the embedded device falls below the load threshold after the message service 108 sends the slow-down message to the plurality of user interfaces 114-1, 114-2, 114-N and/or after the refresh rate of the plurality of user interfaces 114-1, 114-2, 114-N have been altered (e.g., lowered) in response to receiving the slow-down message.

In some examples, the load threshold can be a message load threshold or a first load threshold. As used herein, a message load threshold can, for example, include a load threshold value that corresponds to the action of the message service 108 sending a slow-down message to the plurality of user interfaces 114-1, 114-2, 114-N. In some examples, there can be a plurality of additional load thresholds that correspond to other actions. For example, a second load threshold value can correspond to altering a refresh rate of the plurality of user interfaces 114-1, 114-2, 114-N without consent from the plurality of user interfaces 114-1, 114-2, 114-N. In another example, a third load threshold value can correspond to discontinuing the service 112 for the plurality of user interfaces 114-1, 114-2, 114-N.

The computing system 100 can be utilized to monitor the load of an embedded device 102 that can provide a service such as a service 112 to a plurality of user interfaces 114-1, 114-2, 114-N. In some examples, the computing system 100 can determine when a load threshold has been exceeded by the embedded device 102 and send a slow-down message to the plurality of user interfaces 114-1, 114-2, 114-N to request that the plurality of user interfaces 114-1, 114-2, 114-N lower a refresh rate for a period of time to lower a load of the embedded device 102. In this way, the computing system 100 can avoid discontinuing service to the plurality of user interfaces 114-1, 114-2, 114-N when the embedded device 102 is handling a relatively high computational load.

Figure 2:
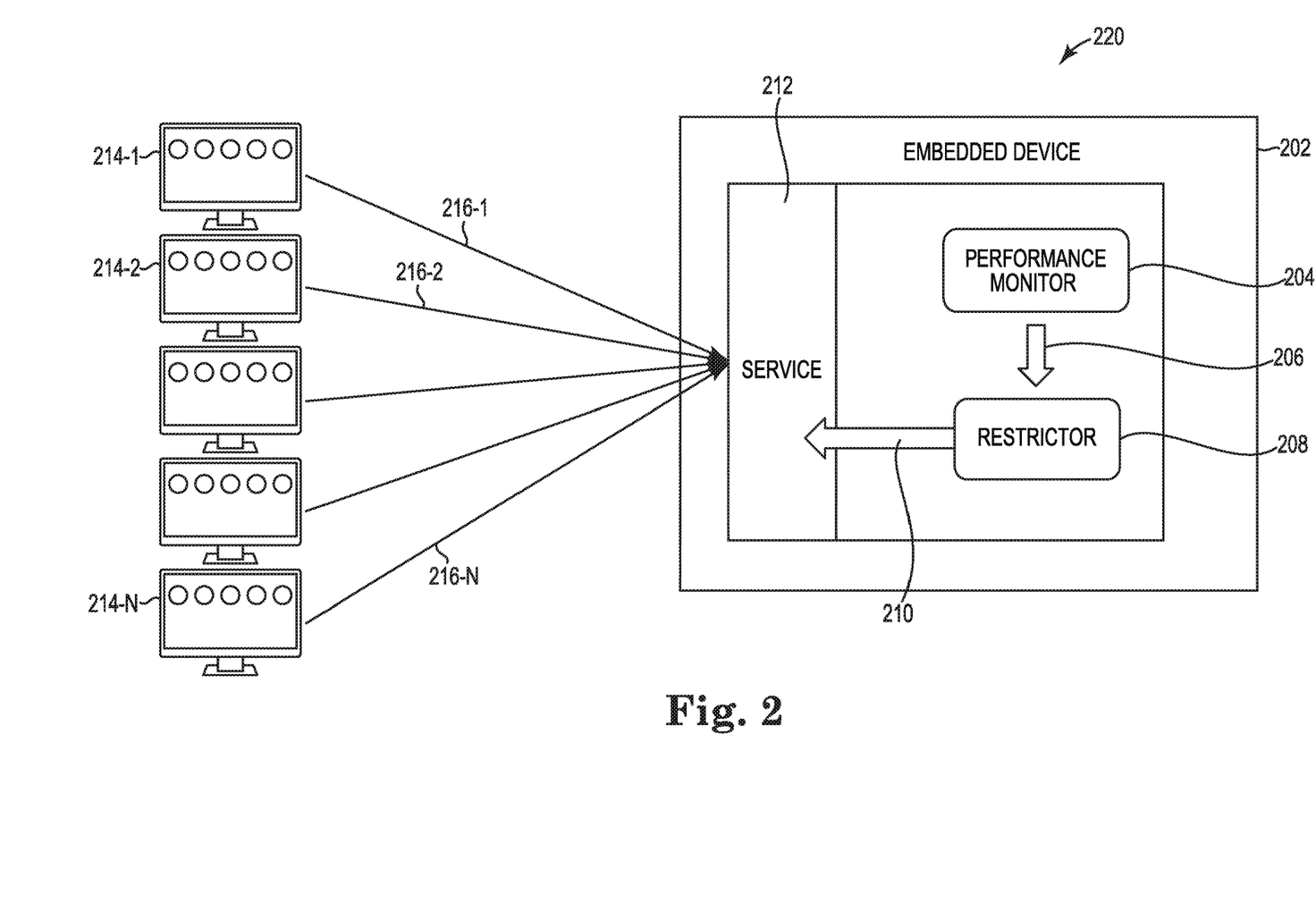
FIG. 2 illustrates an example of a computing system for restricting interactions with an embedded device consistent with the disclosure.

FIG. 2 illustrates an example of a computing system 220 for restricting interactions with an embedded device consistent with the disclosure. The computing system 220 can include the same or similar elements as system 100 referenced in FIG. 1. For example, the system 220 can include an embedded device 202 that can be utilized to provide a service 212 to a plurality of user interfaces 214-1, 214-2, 214-N through communication channels 216-1, 216-2, 216-N.

As described herein, the embedded device 202 can be a device that is not a typical computing device (e.g., laptop, smart phone, tablet, desktop, etc.). In some examples, the embedded device 202 can be embedded with a computing device or embedded with a processing resource and a memory resource that includes instructions to provide the service 212 to the plurality of user interfaces 214-1, 214-2, 214-N. In some examples, the embedded device 202 can include a performance monitor 204 that can monitor the load of the embedded device 202 to determine when the load of the embedded device exceeds a load threshold.

In some examples, the load threshold for the computing system 220 can be a different load threshold than the load threshold referenced for computing system 100 as referenced in FIG. 1. For example, the computing system 220 can utilize a restrictor load threshold that initiates a restrictor 222 and the computing system 100 can utilize a message load threshold that initiates a message service 108 as referenced in FIG. 1. In some examples, a message load threshold can be a first threshold and the restrictor load threshold can be a second threshold. In some examples, the first threshold can be a relatively lower threshold compared to the second threshold. That is, the first threshold can be exceeded by the embedded device 202 and the load of the embedded device 202 can increase past the first threshold to the second threshold.

In some examples, the performance monitor 204 can determine that that the embedded device 202 has exceeded a threshold load for the embedded device 202 and send a notification or message to a restrictor 222 through communication channel 206. For example, the performance monitor 204 can be communicatively coupled to the restrictor 222 such that the performance monitor 204 can send and receive notifications or messages with the restrictor 222. In some examples, the restrictor 222 can include instructions stored on a memory resource that are executable by a processing resource to perform a plurality of functions.

As used herein, a restrictor 222 can, for example, include an application that can alter a refresh rate of a user interface without consent from a user associated with the user interface. For example, the restrictor 222 can include instructions that when executed by a processing resource can alter a refresh rate for the user interface 214-1 utilizing communication channel 216-1. In some examples, a user associated with the user interface 214-1 may not authorize or be aware of the restrictor 222 altering the refresh rate of the user interface 214-1. In this way, the embedded device 202 can dynamically alter the refresh rates of the plurality of user interfaces 214-1, 214-2, 214-N to control a load of the embedded device.

In some examples, the restrictor 222 can receive a notification or message from the performance monitor 204 indicating that the embedded device 202 has exceeded a load threshold. In these examples, the restrictor 222 can alter a refresh rate of the plurality of user interfaces 214-1, 214-2, 214-N a first quantity. In some examples, the first quantity can include a value or percentage utilized to alter (e.g., lower, etc.) a refresh rate of a user interface. In some examples, the performance monitor 204 can continue to monitor a load of the embedded device after the restrictor 222 alters a refresh rate of the plurality of user interfaces 214-1, 214-2, 214-N by the first quantity. In some examples, the performance monitor 204 can determine that the embedded device 202 has a load that still exceeds the load threshold. In these examples, the performance monitor 204 can send a notification or message to the restrictor 222 through communication channel 206. In these examples, the restrictor 222 can alter the refresh rate of the plurality of user interfaces 214-1, 214-2, 214-N by a second quantity or value.

In some examples, the second quantity can be the same or similar value as the first quantity when the second quantity is utilized to alter the refresh rate in addition to the first quantity. For example, the restrictor 222 can lower a refresh rate of the plurality of user interfaces 214-1, 214-2, 214-N by a first quantity of 10 percent. In this example, the restrictor 222 can lower the refresh rate by a second quantity of 10 percent if the load threshold is still exceeded for a particular quantity of time after the restrictor 222 alters the refresh rate of the plurality of user interfaces 214-1, 214-2, 214-N. In this example, the second quantity can lower the overall refresh rate for the plurality of user interfaces 214-1, 214-2, 214-N by 20 percent.

In some examples, the restrictor 222 can alter the refresh rate of the plurality of user interfaces 214-1, 214-2, 214-N back to a previous refresh rate when the performance monitor 204 sends a notification or message to the restrictor 222 indicating that the load of the embedded device is no longer above a load threshold. For example, the restrictor 222 can increase the refresh rate a value of 10 percent when the restrictor 222 previously lowered the refresh rate a value of 10 percent when the performance monitor 204 sends a notification or message to the restrictor 222 indicating that the embedded device 202 is no longer above a load threshold. In this way, the restrictor 222 can dynamically increase and decrease the refresh rate of the plurality of user interfaces 214-1, 214-2, 214-N based on the load of the embedded device 202.

Figure 3:
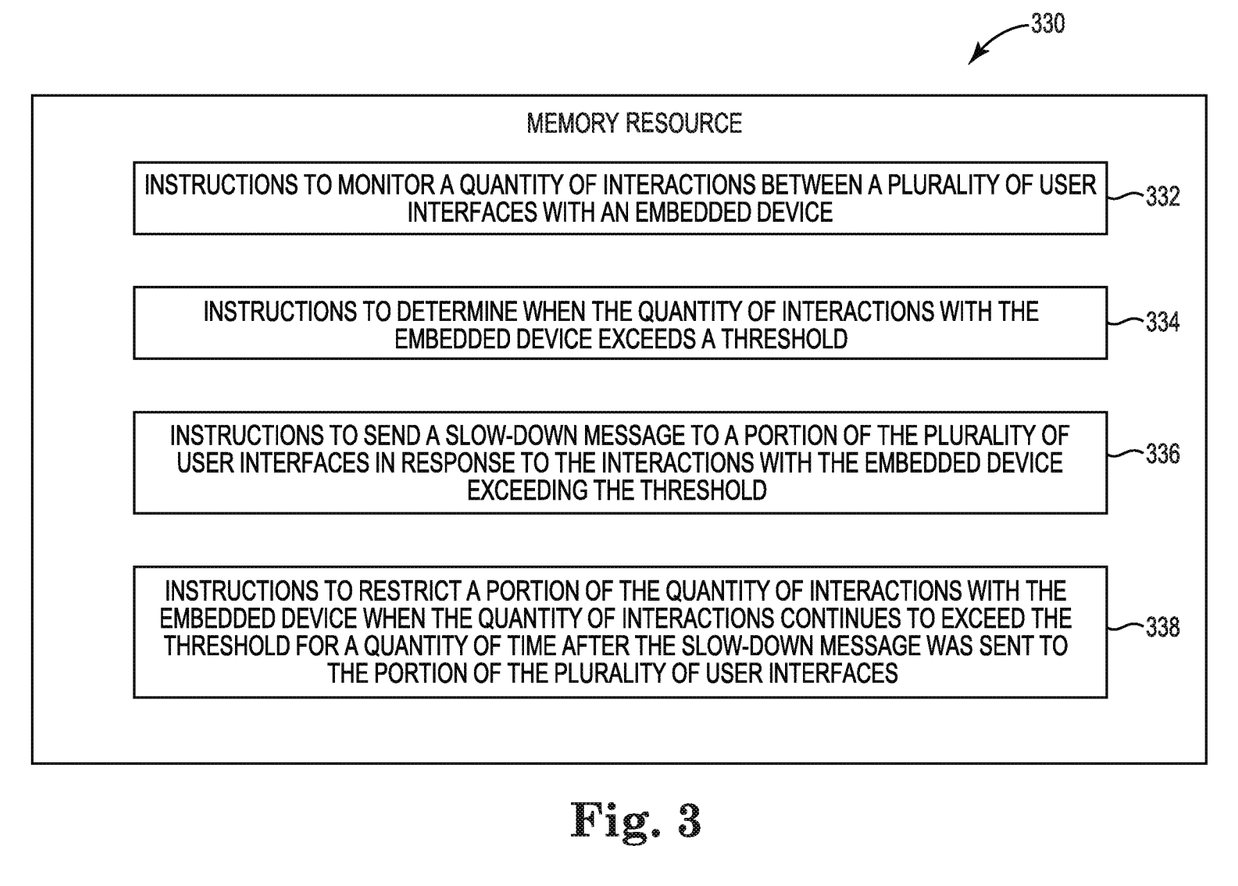
FIG. 3 illustrates a block diagram of an example of a memory resource for restricting interactions with an embedded device consistent with the disclosure.

FIG. 3 illustrates a block diagram of an example of a memory resource 330 for restricting interactions with an embedded device consistent with the disclosure. In some examples, the memory resource 330 can be utilized to store instructions 332, 334, 336, 338 that can be executed by a processing resource to perform functions described herein. In some examples, the processing resource can be coupled to the memory resource 330 via a connection. A processing resource may be a central processing unit (CPU), microprocessor, and/or other hardware device suitable for retrieval and execution of instructions stored in memory resource 330.

Memory resource 330 may be any electronic, magnetic, optical, or other physical storage device that stores executable instructions 332, 334, 336, 338. Thus, memory resource 330 may be, for example, Random Access Memory (RAM), an Electrically-Erasable Programmable Read-Only Memory (EEPROM), a storage drive, an optical disc, and the like. The executable instructions 332, 334, 336, 338 may be stored on the memory resource 330. Memory resource 330 may be a portable, external or remote storage medium, for example, that allows the instructions 332, 334, 336, 338 to be downloaded from the portable/external/remote storage medium. In this situation, the executable instructions 332, 334, 336, 338 may be part of an "installation package". As described herein, memory resource 330 may be encoded with executable instructions 332, 334, 336, 338 for restricting interactions with an embedded device as described herein.

In some examples, the memory resource 330 can include instructions 332 that are executable by a processing resource to monitor a quantity of interactions between a plurality of user interfaces with an embedded device. As described herein, the instructions 332 to monitor a quantity of interactions can include instructions to monitor a load of the embedded device. In some examples, the quantity of interactions between the plurality of user interfaces with the embedded device includes HTTPS calls from the plurality of user interfaces to the embedded device to refresh data provided by the plurality of user interfaces.

As described herein, the load of the embedded device can correspond to a quantity of interactions with a plurality of user interfaces. For example, the embedded device can be utilized to generate a plurality of user interfaces for a plurality of remote devices (e.g., computing devices, etc.). In this example, the plurality of user interfaces can interact with the embedded device through information requests or update requests from a service provided by the embedded device through polling. In this example, the polling from each of the plurality of user interfaces can be performed at a particular rate (e.g., refresh rate) and the particular rate or quantity of interactions can affect the load of the embedded device.

In some examples, monitoring the quantity of interactions between the plurality of user interfaces and the embedded device can be utilized to determine the load of the embedded device and/or determine when the embedded device has exceeded a load threshold. As described herein, the load threshold can be based on the computational capabilities of the embedded device to provide a service for the plurality of user interfaces.

In some examples, the memory resource 330 can include instructions 334 that are executable by a processing resource to determine when the quantity of interactions with the embedded device exceeds a threshold. As described herein, a performance monitor can be utilized to monitor the quantity of interactions between the embedded device and a plurality of user interfaces. In some examples, the embedded device may have limited computing capabilities and when a load on the computing capabilities exceeds the threshold, the embedded device may not be capable of providing a particular quality of service to the plurality of user interfaces. In this way, the threshold can be based on the computing capabilities of the embedded device.

In some examples, the determination that the quantity of interactions has exceeded a threshold can include a determination that the load of the embedded device has exceeded a threshold. In some examples, the embedded device can also perform other functions that are not related to the plurality of user interfaces. In these examples, the load of the embedded device can include a computational load of providing the user interfaces and the other functions performed by the embedded device.

In some examples, the memory resource 330 can include instructions 336 that are executable by a processing resource to send a slow-down message to a portion of the plurality of user interfaces in response to the interactions with the embedded device exceeding the threshold. As described herein, a performance manager can send a notification to a message service that the embedded device has exceeded the threshold. In some examples, the message service can send a slow-down message to a plurality of user interfaces. As described herein, the slow-down message can include a message that can be displayed by the user interface. In some examples, the message can include a request to lower a refresh rate for the user interface. In these examples, the user interface can receive an input to alter the refresh rate of the user interface in response to the slow-down message. For example, a user of the user interface can manually alter the refresh rate of the user interface.

In some examples, the memory resource 330 can include instructions 338 that are executable by a processing resource to restrict a portion of the quantity of interactions with the embedded device when the quantity of interactions continues to exceed the threshold for a quantity of time after the slow-down message was sent to the portion of the plurality of user interfaces. As used herein, restricting a portion of the quantity of interactions can include altering a refresh rate of a user interface. For example, the embedded device can utilize a restrictor that can alter a refresh rate of a portion of the plurality of user interfaces from a first rate to a second rate. In this example, the restrictor can alter the quantity of interactions with the plurality of user interfaces by altering the refresh rate of the user interfaces. In some examples, the instructions 338 can include instructions to alter an initial polling interval of the portion of user interfaces to a sub-polling interval that is less than the initial polling interval.

In some examples, the memory resource 330 can include instructions that are executable by the processing resource to determine when the quantity of interactions with the embedded device is below the threshold. In these examples, the memory resource 330 can include instructions that are executable by the processing resource to send a resume-speed message to the portion of the plurality of user interfaces in response to the determination that the quantity of interactions with the embedded device is below the threshold. As used herein, a resume-speed message can, for example, include a message that indicates that a particular device or user interface can alter a refresh rate to a relatively higher rate. For example, the resume speed message can indicate that a user interface can resume a previous refresh rate prior to receiving a slow-down message and/or prior to being altered by a restrictor.

In some examples, the memory resource 330 can include instructions that are executable by the processing resource to determine when the quantity of interactions with the embedded device is below the threshold. In these examples, the memory resource 330 can include instructions that are executable by the processing resource to allow the portion of the quantity of interactions with the embedded device to increase in response to the determination that the quantity of interactions with the embedded device is below the threshold.

In some examples, the restrictor can restrict the portion of the quantity of interactions without consent from the plurality of user interfaces. For example, a refresh rate setting of the plurality of user interfaces can be altered by the restrictor. In this way, the embedded device can dynamically alter the quantity of interactions with the plurality of user interfaces based on a load of the embedded device.

Figure 4:
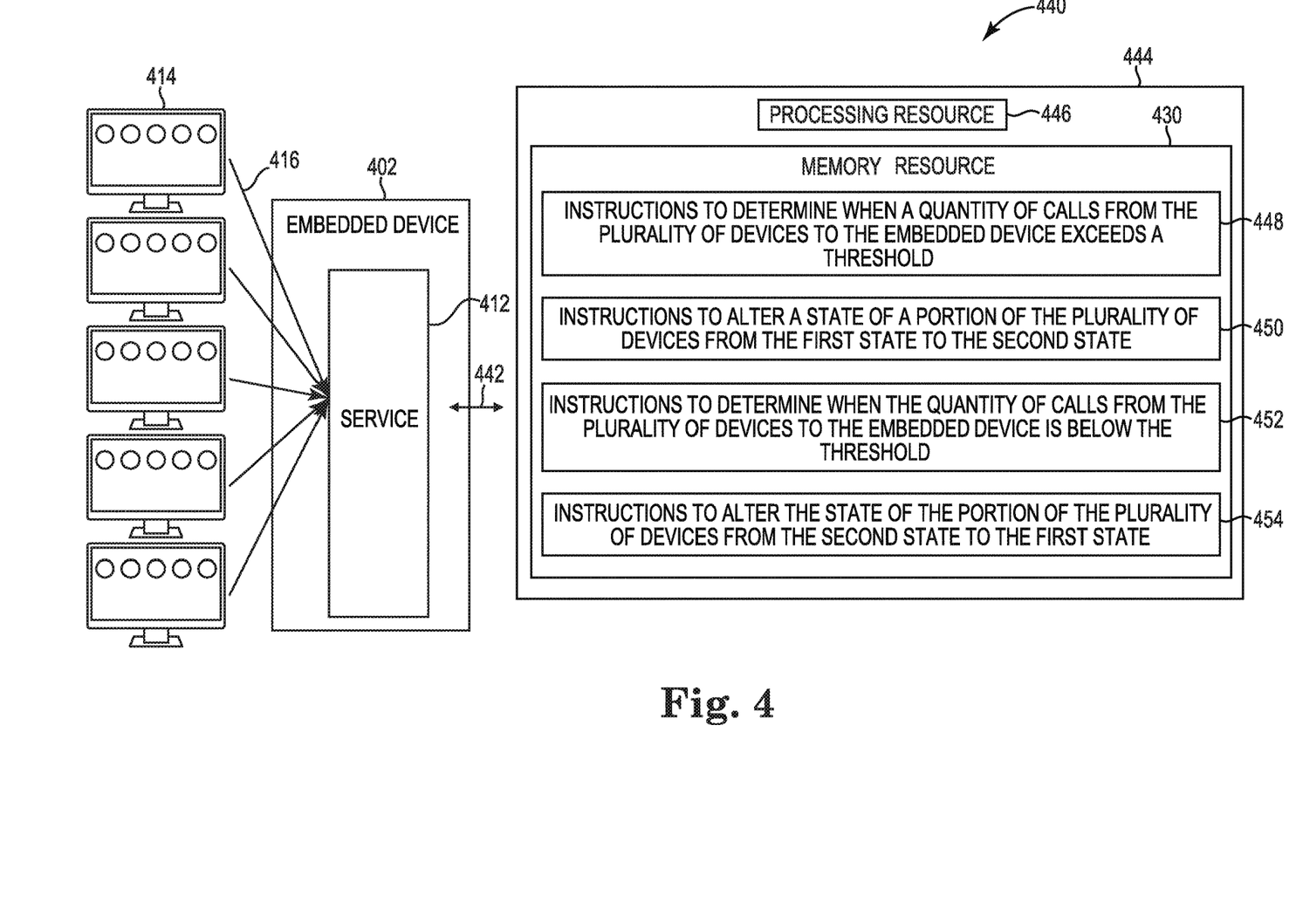
FIG. 4 illustrates an example of a computing system for restricting interactions with an embedded device consistent with the disclosure.

FIG. 4 illustrates an example of a computing system 440 for restricting interactions with an embedded device 402 consistent with the disclosure. In some examples, the system 440 can include an embedded device 402 that can be coupled to a computing device 444. In some examples, the computing device 444 can include a processing resource 446 and a memory resource 430 storing instructions 448, 450, 452, 454. As described herein, the memory resource 430 can be utilized to store instructions 448, 450, 452, 454 that can be executed by a processing resource 446 to perform functions described herein. In some examples, the processing resource 446 can be coupled to the memory resource 430 via a connection. A processing resource 446 may be a central processing unit (CPU), microprocessor, and/or other hardware device suitable for retrieval and execution of instructions 448, 450, 452, 454 stored in the memory resource 430.

In some examples, the computing device 444 can be communicatively coupled through a communication channel 442 to the embedded device 402 to generate a service 412. In some examples, the computing device 444 can be embedded within an enclosure of the embedded device 402. As described herein, the embedded device 402 can be a device that is not a computing device but is embedded with the computing device 444 to provide a function such as restricting interactions with the embedded device 402. In some examples, the computing system 440 can include the plurality of devices to call the embedded device 402 at a first polling interval during a first state and call the embedded device 402 at a second polling interval during a second state. In some examples, the polling interval of the plurality of devices can be a refresh rate and/or rate of interactions between the user interfaces 414 of the plurality of devices and the embedded device 402.

In some examples, the memory resource 430 can include instructions 448 that are executable by a processing resource 446 to determine when a quantity of calls from the plurality of devices to the embedded device 402 exceeds a threshold. In some examples, the plurality of devices can be devices that are utilizing a corresponding user interface 414 generated to utilize the service 412. For example, the plurality of devices can be computing devices that can connect to the service 412 to utilize the user interface 414. In some examples, the quantity of calls can include interactions between the user interface 414 of the plurality of devices and the service. In some examples, the quantity of calls can be HTTP calls to update data or information displayed by the user interface 414 of the plurality of devices.

In some examples, the memory resource 430 can include instructions executable by the processing resource 446 to send a message to the portion of the plurality of devices in response to determining the quantity of calls from the plurality of devices to the embedded device 402 exceeds the threshold. For example, a slow-down message can be sent to the plurality of devices that can indicate to a user to alter a refresh rate of the user interface 414 to a lower level. In some examples, the memory resource 430 can include instructions executable by the processing resource to force an alteration of the state of the portion of the plurality of devices from the first state to the second state when the quantity of calls is above the threshold after a threshold of time from the computing device sending the message to the portion of the plurality of devices. In some examples, the message can be a synchronous response. For example, the synchronous response can include an error response and/or a piggy-backed response along with the requested data. In some examples, the error response can include a notification to reduce a speed or refresh rate by a particular value. In some examples, the piggy-backed response can be embedded in a header of the message (e.g., HTTP header, etc.).

In some examples, the memory resource 430 can include instructions 450 that are executable by a processing resource 446 to alter a state of a portion of the plurality of devices from the first state to the second state. In some examples, the plurality of devices and/or corresponding user interfaces 414 can utilize different states (e.g., first state, second state, third state, etc.) that can each utilize a different refresh rate or rate of interactions with the service 412. For example, the user interface 414 can have a first refresh rate through communication channel 416 during a first state and have a second refresh rate through communication channel 416 during a second state. In this example, the first state can be a normal state or a state when the embedded device 402 is below a load threshold and the second state can be a non-normal state or state when the embedded device 402 is above a load threshold. In this example, the first state can utilize a refresh rate of 60 calls per minute and the second state can utilize a refresh rate of 20 calls per minute.

In some examples, the memory resource 430 can include instructions 452 that are executable by a processing resource 446 to determine when the quantity of calls from the plurality of devices to the embedded device is below the threshold. As described herein, when the refresh rate for the plurality of devices or user interfaces 414 can be lowered during the second state to lower a load of the embedded device 402. In some examples, a performance monitor can determine if or when the load of the embedded device 402 is lowered below a load threshold. In some examples, the quantity of calls from the plurality of devices can also be below a threshold when the quantity of calls corresponds to the load of the embedded device. That is, the performance monitor can utilize a quantity of calls from the plurality of devices or user interfaces 414 to determine when the embedded device is above a load threshold by determining when the quantity of calls is above a call threshold for the embedded device 402.

In some examples, the memory resource 430 can include instructions 454 that are executable by a processing resource 446 to alter the state of the portion of the plurality of devices from the second state to the first state. In some examples, the plurality of devices and/or user interfaces 414 can be altered from the second state to the first state in response to the determination that the quantity of calls is below the threshold. In some examples, altering the state of the plurality of devices can include altering the refresh rate for the plurality of devices and/or user interfaces 414. By utilizing different states for a plurality of different thresholds of the embedded device 402 can allow the embedded device 402 to dynamically alter the quantity of calls and/or load from the plurality of devices and/or user interfaces 414 interacting with the embedded device 402.

Figure 5:
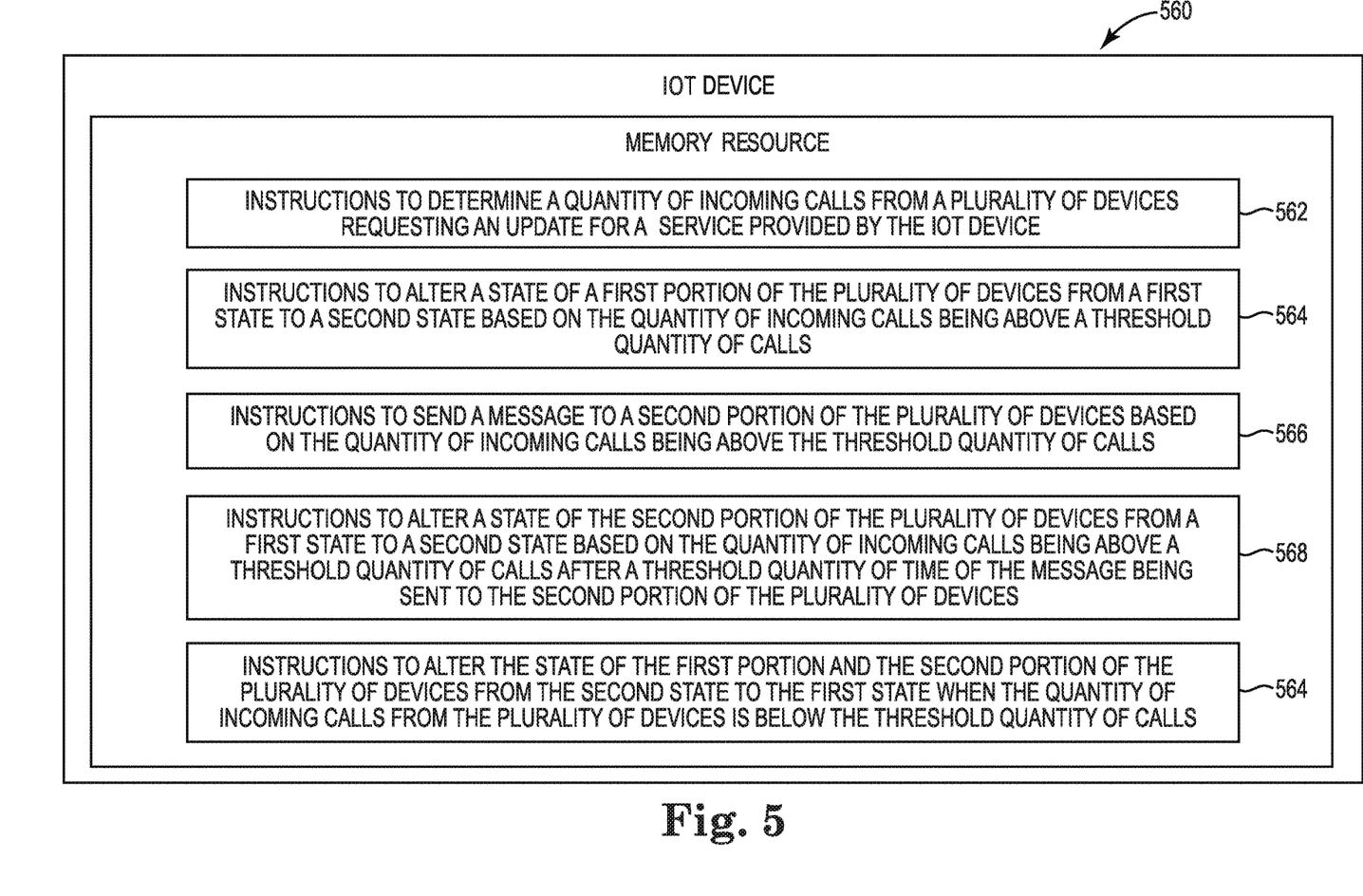
FIG. 5 illustrates a block diagram of an example of an internet of things (IoT) device for restricting interactions with an embedded device consistent with the disclosure

FIG. 5 illustrates a block diagram of an example of an internet of things (IoT) device 560 for restricting interactions with an embedded device consistent with the disclosure. In some examples, the IoT device 560 can include a memory resource 530. As described herein, the memory resource 530 can be utilized to store instructions 562, 564, 566, 568, 570 that can be executed by a processing resource to perform functions described herein. In some examples, the processing resource can be coupled to the memory resource 530 via a connection. A processing resource may be a central processing unit (CPU), microprocessor, and/or other hardware device suitable for retrieval and execution of instructions 562, 564, 566, 568, 570 stored in the memory resource 530.

As described herein, a network or computing system can be an internet of things (IoT) network. As used herein, an IoT network can, for example, include a network of devices (e.g., network devices, computing devices, IoT devices, etc.) with networking capabilities to send and receive data. As used herein, an IoT device can, for example, include a non-traditional network device with networking capabilities to send and receive data with other computing devices and/or other IoT devices.

In some examples, the memory resource 530 can include instructions 562 that are executable by a processing resource to determine a quantity of incoming calls from a plurality of devices requesting an update for a service provided by the IoT device 560. As described herein, the quantity of incoming calls from the plurality of devices can include update requests or refresh requests to update data or information displayed by the user interface of the plurality of devices. In some examples, the quantity of incoming calls can be monitored by a performance monitor to determine a load of the IoT device 560.

In some examples, the memory resource 530 can include instructions 564 that are executable by a processing resource to alter a state of a first portion of the plurality of devices from a first state to a second state based on the quantity of incoming calls being above a threshold quantity of calls. As described herein, the plurality of devices can include a first state with a first refresh rate and a second state with a second refresh rate. Even though a first state and a second state are described, the disclosure is not limited to two states and a plurality of additional states can be added. In some examples, the quantity of incoming calls can correspond to or affect a load of the IoT device 560. For example, a greater quantity of incoming calls can correspond to a greater load utilized by the IoT device 560.

In some examples, only a portion of the plurality of devices can be altered from the first state to the second state to alter the first portion and not alter the second portion. In this way, the IoT device 560 can selectively alter a state or refresh rate of a particular portion of a plurality of devices. In some examples, the portion of the plurality of devices that are altered from the first state to the second state can be devices that are determined to be idle or not utilized to the extend as the portion of the plurality of devices that are not altered. A number of metrics can be utilized to determine which portion of the plurality of devices are to be altered from the first state to the second state. For example, the metrics can, but are not limited to: an activity state of the user interface, a quantity of time the user interface has been idle, a status of a user associated with the user interface, among other metrics that can be utilized to determine a priority of the plurality of devices. For example, a plurality of metrics can be utilized to rate the plurality of devices from a high priority to a low priority. In these examples, the devices with a relatively high priority may not be forced to alter a refresh rate and devices with a relatively low priority may be forced to alter the refresh rate to lower a load of the IoT device 560.

In some examples, the memory resource 530 can include instructions 566 that are executable by a processing resource to send a message to a second portion of the plurality of devices based on the quantity of incoming calls being above the threshold quantity of calls. In some examples, the second portion of the plurality of devices can be sent a slow-down message instead of forcing a change from the first state to the second state. In some examples, the second portion of the plurality of devices can have a relatively higher priority compared to the first portion of the plurality of devices. In some examples, the message or slow-down message can include a message that requests the second portion of the plurality of devices to alter from the first state to the second state.

In some examples, the memory resource 530 can include instructions 568 that are executable by a processing resource to alter a state of the second portion of the plurality of devices from a first state to a second state based on the quantity of incoming calls being above a threshold quantity of calls after a threshold quantity of time of the message being sent to the second portion of the plurality of devices. In some examples, the IoT device 560 can determine that the quantity of calls and/or load of the IoT device 560 is still above a threshold for a period of time that exceeds a time threshold and that the second portion of the plurality of devices are to be altered from the first state to the second state. In these examples, the IoT device 560 can force the second portion of the plurality of devices to alter from the first state to the second state.

In some examples, the memory resource 530 can include instructions 570 that are executable by a processing resource to alter the state of the first portion and the second portion of the plurality of devices from the second state to the first state when the quantity of incoming calls from the plurality of devices is below the threshold quantity of calls. In some examples, altering the state of the plurality of devices from the first state to the second state can lower a load or quantity of calls received by the IoT device 560 to a level below a threshold. In these examples, the IoT device 560 can determine that the plurality of devices can return to the first state. In these examples, the IoT device 560 can alter the state of the plurality of devices from the second state to the first state.

In some examples, the IoT device 560 can include instructions to determine a maximum performance of the IoT device 560 based on a capability of the IoT device 560 to provide updates to the plurality of devices in response to the incoming calls. For example, the max performance can be a maximum load that the IoT device 560 can provide for the plurality of devices. That is, the maximum performance of the IoT device 560 can correspond to a maximum quantity of calls the IoT is capable of handling at a particular time. In some examples, the IoT device 560 can include instructions to determine the threshold quantity of calls for the plurality of devices based on the determined max performance of the IoT device 560.

In some examples, a portion of the plurality of devices may not have been altered from the first state to the second state. In these examples, the portion of the plurality of devices that remained in the first state can continue to remain in the first state while the remaining portion of the plurality of devices can be altered from the second state to the first state. In this way, the IoT device 560 can dynamically alter a state of the plurality of devices to prevent the IoT device 560 from being overloaded or causing an error due to the overload.

In the foregoing detailed description of the disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the disclosure.

The figures herein follow a numbering convention in which the first digit corresponds to the drawing figure number and the remaining digits identify an element or component in the drawing. Similar elements or components between different figures can be identified by the use of similar digits. For example, 102 can reference element "02" in FIG. 1, and a similar element can be referenced as 202 in FIG. 2. Elements shown in the various figures herein can be added, exchanged, and/or eliminated so as to provide a plurality of additional examples of the disclosure. In addition, the proportion and the relative scale of the elements provided in the figures are intended to illustrate the examples of the disclosure and should not be taken in a limiting sense. As used herein, the designator "N", particularly with respect to reference numerals in the drawings, indicates that a plurality of the particular feature so designated can be included with examples of the disclosure. The designators can represent the same or different numbers of the particular features. Further, as used herein, "a plurality of" an element and/or feature can refer to more than one of such elements and/or features.

What is claimed:

1. An internet of things (IoT) device comprising instructions executable by a processing resource to:
   determine a quantity of incoming calls from a plurality of devices requesting an update for a service provided by the IoT device, wherein the quantity of incoming calls occur at a first refresh rate during a first state and at a second refresh rate during a second state and a call comprises a call from a device to the IoT device to update data displayed by the device;
   alter a state of a first portion of the plurality of devices from the first state to the second state based on the quantity of incoming calls being above a threshold quantity of calls;
   send a message to a second portion of the plurality of devices based on the quantity of incoming calls being above the threshold quantity of calls;
   alter a state of the second portion of the plurality of devices from the first state to the second state based on the quantity of incoming calls being above a threshold quantity of calls after a threshold quantity of time of the message being sent to the second portion of the plurality of devices;
   alter the state of the first portion and the second portion of the plurality of devices from the second state to the first state when the quantity of incoming calls from the plurality of devices is below the threshold quantity of calls;
   determine a max performance of the IoT device based on a capability of the IoT device to provide updates to the plurality of devices in response to the incoming calls; and
   determine the threshold quantity of calls for the plurality of devices based on the determined max performance of the IoT device.

2. The IoT device of claim 1, wherein the instructions to alter the state of the first portion of the plurality of devices includes lowering a refresh rate of first portion of the plurality of devices for the service provided by the IoT device.

3. The IoT device of claim 1, wherein the quantity of interactions between the plurality of devices with the IoT device includes HTTPS calls from the plurality of devices to the IoT device to refresh data provided by the plurality of devices.

4. The IoT device of claim 1, comprising instructions executable by a processing resource to:
   determine when a load of the IoT device exceeds a threshold; and
   after a state of the first portion of the plurality of devices from a first state to a second state in response to the load of the IoT device exceeding the threshold.

5. The IoT device of claim 1, comprising instructions executable by a processing resource to alter the state of the first portion of the plurality of devices from the second state to a third state when the quantity of interactions continues to exceed the threshold for a quantity of time.

6. The IoT device of claim 5, wherein the first portion of the plurality of devices call the IoT device at a third refresh rate when operating in the third state.

7. A method comprising:
   determining, at an internet of things (IoT), a quantity of incoming calls from a plurality of devices requesting an update for a service provided by the IoT device, wherein the quantity of incoming calls occur at a first refresh rate during a first state and at a second refresh rate during a second state and a call comprises a call from a device to the IoT device to update data displayed by the device;
   altering, by the IoT device, a state of a first portion of the plurality of devices from the first state to the second state based on the quantity of incoming calls being above a threshold quantity of calls;
   sending, by the IoT device a message to a second portion of the plurality of devices based on the quantity of incoming calls being above the threshold quantity of calls;
   altering a state of the second portion of the plurality of devices from the first state to the second state based on the quantity of incoming calls being above a threshold quantity of calls after a threshold quantity of time of the message being sent to the second portion of the plurality of devices; and
   altering the state of the first portion and the second portion of the plurality of devices from the second state to the first state when the quantity of incoming calls from the plurality of devices is below the threshold quantity of calls,
   wherein the threshold quantity of calls for the plurality of devices based on a determined max performance of the IoT device, and
   wherein the determined max performance of the IoT device is based on a capability of the IoT device to provide updates to the plurality of devices in response to the incoming calls.

8. The method of claim 7, further comprising lowering a refresh rate of a first portion of the plurality of devices for the service provided by the IoT device.

9. The method of claim 7, wherein the quantity of interactions between the plurality of devices with the IoT device includes HTTPS calls from the plurality of devices to the IoT device to refresh data provided by the plurality of devices.

10. The method of claim 7, further comprising:
    determining when a load of the IoT device exceeds a threshold; and
    altering a state of the first portion of the plurality of devices from a first state to a second state in response to the load of the IoT device exceeding the threshold.

11. The method of claim 7, comprising instructions executable by a processing resource to alter the state of the first portion of the plurality of devices from the second state to a third state when the quantity of interactions continues to exceed the threshold for a quantity of time.

12. The method of claim 11, wherein the first portion of the plurality of devices call the IoT device at a third refresh rate when operating in the third state.

* * * * *